(No Model.)
J. W. HERRIOTT.
TWINE BOX.
No. 518,504. Patented Apr. 17, 1894.
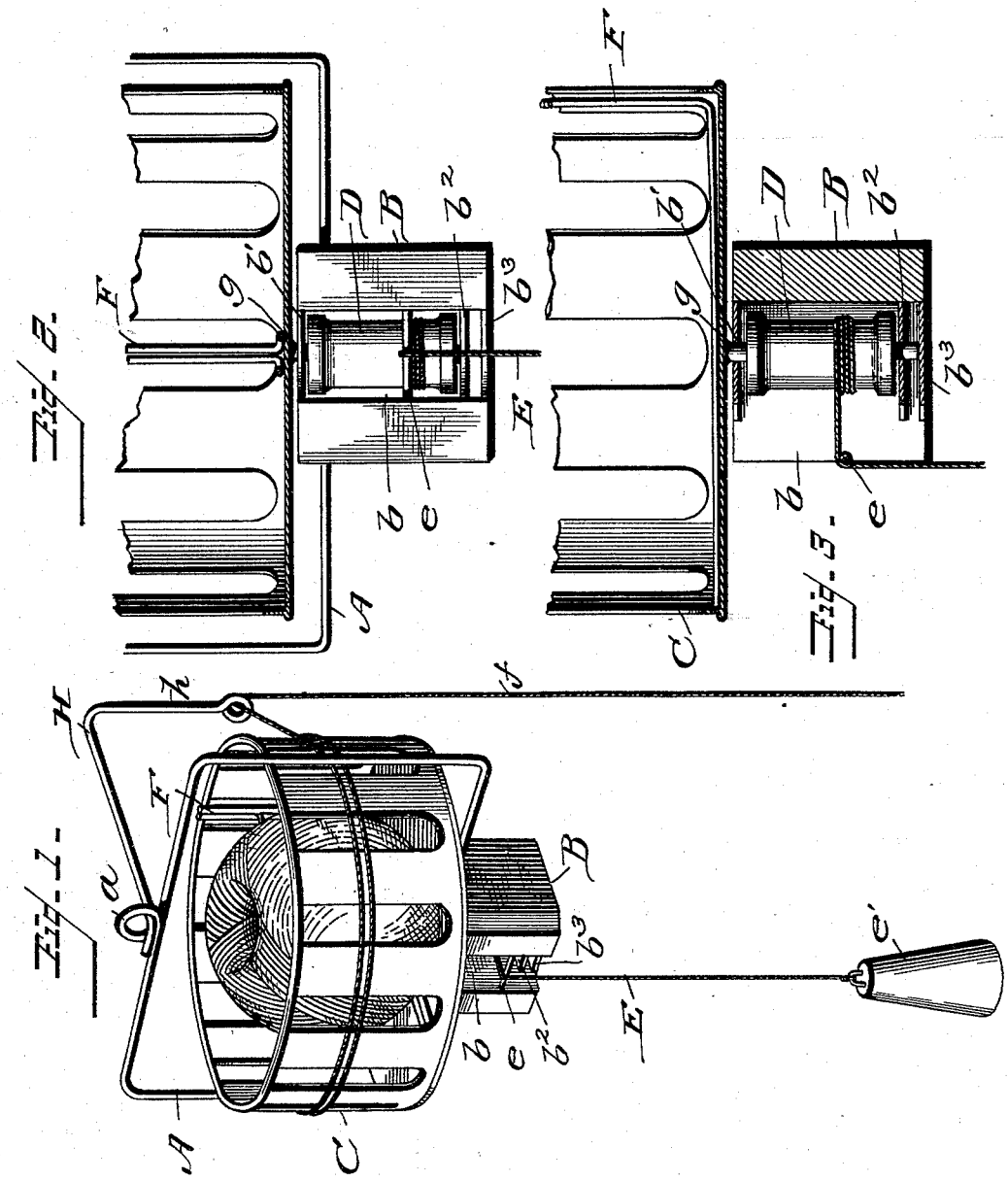
Witnesses
Inventor
John W. Herriott.
By Attorneys

UNITED STATES PATENT OFFICE.

JOHN W. HERRIOTT, OF HUBBELL, NEBRASKA.

TWINE-BOX.

SPECIFICATION forming part of Letters Patent No. 518,504, dated April 17, 1894.

Application filed December 10, 1892. Serial No. 454,763. (No model.)

*To all whom it may concern:*

Be it known that I, JOHN W. HERRIOTT, a citizen of the United States, residing at Hubbell, in the county of Thayer, State of Nebraska, have invented certain new and useful Improvements in Twine-Boxes; and I do hereby declare the following to be a full, clear, and exact description of the invention, such as will enable others skilled in the art to which it appertains to make and use the same.

My invention relates to twine holders of that class which automatically take up the loose end of the string.

The purpose of the invention is to provide a simple structure in which all the parts are accessible for repair, and which will be efficient and give satisfactory results.

The invention consists of the novel features and the peculiar construction and combination of the parts which will be hereinafter more fully described and claimed and which are shown in the annexed drawings, in which—

Figure 1 is a perspective view of a twine holder of my invention. Fig. 2 is a front view of the lower portion of the counterbalanced frame. Fig. 3 is a sectional on the line X—X of Fig. 2, showing a portion of the bottom of the twine box.

The counterbalanced frame A may be of any desired form, but for convenience is preferably rectangular, and is weighted at its lower side as shown at B, and is provided at its upper side with an eye $a$ by means of which the twine holder is suspended from a nail or other support. The weight B is of sufficient mass to give stability to the device and prevent the same tilting too much when drawing the twine from the twine box C. The weight B is provided in one side with a recess $b$ of sufficient depth and size to receive the spool D upon which the re-winding cord E is wound. The front portion of the recess $b$ is narrower than the inner portion, which latter is made larger to give ample room for the free working of the spool D. The spindle $g$ attached to and depending from the twine box C, is journaled in plates $b'$ and $b^2$ which are located in the recess $b$, and rests upon a plate $b^3$ which forms a support for the said spindle. The several plates $b'$, $b^2$ and $b^3$ are attached to the weight B in any convenient manner, preferably by being soldered thereto. A cross bar $e$ extending across the open side of the recess $b$ constitutes a guide for the re-winding cord E. The twine box C is circular in form and is provided with a series of openings in its side to give the same neat and light appearance. The tension device for preventing the twine running off the ball too freely is composed of two parallel wires F F which extend the full height of the twine box and are located in one of the vertical openings. The lower portions of the wires F F extend across the bottom of the twine box and are secured thereto at their inner ends. The twine $f$ as it runs off from the ball can play up and down between the wires F F and adapt itself to the position of the ball. The arm H which projects from the upper side of the counterbalanced frame A has its outer portion $h$ turned down and provided with an eye through which the twine $f$ passes. The deflected portion $h$ of the arm is of sufficient length so that the eye comes about opposite the middle of the twine box, thereby properly guiding the twine when the loose end is taken up by the retrograde motion of the twine box after the twine is released. This arm H will be of a proper length to bring the twine within convenient reach and will vary according to the position of the twine box.

The operation of the invention is as follows: The ball of twine placed in the twine box and the twine passed between the tension wires F F and wrapped around the twine box a sufficient distance to take up the loose end of the twine the desired distance. The twine is then passed through the eye at the outer end of the arm H and the end brought in convenient reach. The re-winding cord E being provided at its lower end with weight $e'$ and having its upper end attached to the spool D is provided for the purpose of returning the twine box to a normal position after the twine is released. When it is desired to obtain a piece of twine the latter is drawn, the first operation being to unwind the twine from the twine box by rotating the same on its spindle $g$. This operation produces a rotation of the spool D and winds the cord E thereon. After the required amount of twine has been obtained and the loose end liberated, the weight $e'$ will react and unwind the cord E from the spool D and cause the twine box C to rotate in a reverse direction and again wind the twine $f$ thereon to take up the loose end. By reason of the weight $e'$ and the cord E the twine $f$ may be wrapped around the twine box as many times as desired to take up the loose end the required distance, and the length of said cord E can be easily regulated.

Should any of the parts get out of order they can be easily repaired without requiring a skilled mechanic.

Having thus described my invention, what I claim, and desire to secure by Letters Patent, is—

1. A twine holder comprising a frame adapted to be suspended from its upper end, a laterally extending arm rigidly attached at its inner end to the upper portion of the frame and having a cord guide at the outer end, a weight at the lower end of the frame to give stability and steadiness to the structure, a twine box supported on the frame between the said arm and the weight, a spool supported by and located within the said weight and a weighted cord for automatically returning the twine box to a normal position after being turned by drawing off a quantity of cord and on releasing the end of the latter, substantially as described.

2. A twine holder composed of a frame adapted to be suspended from its upper end, a weight at the lower end of the frame to steady and give stability to the structure, a twine box supported between the upper and the lower portions of the frame above and journaled in the said weight, a spool on the journal of the twine box located within the said weight, a weighted cord adapted to wind on the said spool to return the box to a normal position, and a guide arm attached to the upper end of the said frame and having its outer end bent down and provided with a guide eye for the cord, substantially as described.

In testimony whereof I affix my signature in presence of two witnesses.

JOHN W. HERRIOTT.

Witnesses:
J. H. HURSH,
W. H. CONKLIN.